(12) United States Patent
Tanaka et al.

(10) Patent No.: US 6,417,344 B1
(45) Date of Patent: Jul. 9, 2002

(54) ACETYLATED PYROXYLIN, AND ITS PRODUCTION PROCESS

(75) Inventors: Tokuji Tanaka; Kazuhiro Nishioka, both of Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/350,172

(22) Filed: Jul. 9, 1999

(30) Foreign Application Priority Data

Jul. 10, 1998 (JP) .......................................... 10-195292

(51) Int. Cl.7 .............................. C08B 5/02; C08B 5/04
(52) U.S. Cl. .............................. 536/36; 536/37; 536/38
(58) Field of Search ............................... 536/36, 37, 38

(56) References Cited

U.S. PATENT DOCUMENTS

| | | | |
|---|---|---|---|
| 1,917,401 A | * | 7/1933 | Staud et al. |
| 2,125,880 A | * | 8/1938 | Berl |
| 4,323,669 A | * | 4/1982 | Bolleter et al. ................ 536/38 |

FOREIGN PATENT DOCUMENTS

| | | |
|---|---|---|
| JP | 56-82849 | 7/1981 |
| JP | 8-277301 | 10/1996 |
| JP | 10-195292 | 7/1998 |

* cited by examiner

Primary Examiner—James O. Wilson
Assistant Examiner—Leigh C. Maier
(74) Attorney, Agent, or Firm—Armstrong, Westerman & Hattori, LLP

(57) ABSTRACT

The starting pyroxylin is subjected to an acetylation reaction while it is dispersed in a dispersion medium such as toluene and kept in a solid phase state, and acetylated pyroxylin is then separated from a reaction solution by means of filtration, so that an extra portion of anhydrous acetic acid taking no part in the reaction can be immediately recovered. This dispenses with the precipitation process required for a prior art solution reaction, and so eliminates an unstable quality factor due to product particle size variations. In addition, the process of washing the post-reaction crude acetylated pyroxylin is designed to include a washing step at a high temperature of 60 to 105° C. and a washing step using a stabilizer-containing washing agent, so that acetylated pyroxylin having improved heat resistance and stability can be provided.

8 Claims, No Drawings

ACETYLATED PYROXYLIN, AND ITS PRODUCTION PROCESS

TECHNICAL ART

The present invention relates to a method for producing acetylated pyroxylin (or, in another parlance, cellulose acetate nitrate) used as starting materials for explosives, paints, etc. More particularly, the present invention provides a fine fiber form of acetylated pyroxylin having improved heat resistance and stability.

BACKGROUND ART

Acetylated pyroxylin, in which heat resistance is imparted to pyroxylin (or, in another parlance, nitrocellulose), is obtained by dissolving pyroxylin in a suitable organic solvent for an actylation reaction with anhydrous acetic acid, etc. in the presence of a suitable catalyst, and precipitating the reaction product in water or an alcohol (see JP-A's 56-82849 and 8-277301).

One problem with this reaction for forming an acetic acid ester with respect to a residual hydroxyl group in pyroxylin is that the efficiency of using the starting anhydrous acetic acid is low. This is because any fast progress of the reaction is unachievable unless the anhydrous acetic acid is used in an amount that is 2 to 20 times as large as the theoretically required amount. An unreacted extra portion of the anhydrous acetic acid then reacts with a water or alcohol precipitation agent at the next precipitation step, and so changes to acetic acid or an acetic acid ester such as ethyl acetate, rendering it impossible to recover the anhydrous acetic acid as such. Another problem is the need of using a costly high-speed agitator at the precipitation step. Yet another problem is that the powder particle size of acetylated pyroxylin varies due to precipitation, causing the reaction solution component to be included in particles having a large diameter. This then appears in the form of impurities which result in unstable quality.

DISCLOSURE OF THE INVENTION

In view of the aforesaid problems, an object of the invention is to provide a method capable of recovering an extra portion of anhydrous acetic acid taking no part in a reaction with pyroxylin. Another object of the invention is to provide an acetylated pyroxylin product having improved heat resistance and stability by dispensing with any precipitation step and thereby simplifying production installations and eliminating an unstable quality factor due to product particle size variations.

As a result of study after study, the inventors have now found that pyroxylin is first subjected to an acetylation reaction while the pyroxylin is dispersed in a sort of dispersion medium and kept in a solid phase state, and acetylated pyroxylin is then separated from a reaction solution by means of filtration, so that an extra portion of the anhydrous acetic acid taking no part in the reaction can be immediately recovered and, hence, any precipitation step can be dispensed with to eliminate an unstable product quality factor due to product particle size variations.

Thus, the present invention provides a method for producing acetylated pyroxylin by action of an acetylating agent and a catalyst on pyroxylin, characterized by dispersing said pyroxylin in a dispersion medium to subject said pyroxylin to an acetylation reaction while said pyroxylin is kept in a solid phase state, and separating acetylated pyroxylin from a reaction solution by means of filtration.

The present invention also provides a fine fiber form of acetylated pyroxylin having improved heat resistance and stability.

According to one aspect, the present invention is embodied as follows.

(1) A method for producing acetylated pyroxylin by action of an acetylating agent and a catalyst on pyroxylin, characterized by dispersing said pyroxylin in a dispersion medium to subject said pyroxylin to an acetylation reaction while said pyroxylin is kept in a solid phase state, thereby obtaining crude acetylated pyroxylin, separating said crude actylated pyroxylin from a reaction solution by means of filtration, and washing said crude acetylated pyroxylin upon separation.

(2) The actylated pyroxylin production method according to (1), characterized in that said acetylating agent is anhydrous acetic acid, and said dispersion medium is an organic solvent which has a boiling point between 40° C. and 200° C. at normal pressure, in which said pyroxylin and said acetylated pyroxylin are insoluble and which is unreactive with said anhydrous acetic acid.

(3) The acetylated pyroxylin production method according to (2), characterized in that said dispersion medium comprises an aromatic hydrocarbon selected from the group consisting of aromatic hydrocarbons having 6 to 10 carbon atoms or a mixture of two or more such aromatic hydrocarbons.

(4) The acetylated pyroxylin production method according to any one of (1) to (3), characterized in that said catalyst is selected from the group consisting of p-toluenesulfonic acid and perchloric acid.

(5) The acetylated pyroxylin production method according to any one of (1) to (4), characterized in that a washing agent used for washing said crude acetylated pyroxylin is water and/or an organic solvent in which said acetylated pyroxylin is insoluble and which has a boiling point between 40° C. and 200° C. at normal pressure.

(6) The acetylated pyroxylin production method according to (5), characterized in that said organic solvent used as said washing agent is an alcohol having 1 to 4 carbon atoms.

(7) The acetylated pyroxylin production method according to (5), characterized in that a compound or compounds of an alkali metal and/or an alkaline earth metal are added into said water used as said washing agent.

(8) The acetylated pyroxylin production method according to any one of (1) to (7), characterized in that a process of washing said crude acetylated pyroxylin includes a step of holding said crude acetylated pyroxylin in said washing agent at a temperature of 60° C. to 105° C.

(9) An acetylated pyroxylin characterized in that fine fibers having a fiber diameter of 0.01 mm to 0.05 mm and a fiber length of at least 0.2 mm account for at least 90% by weight of all fibers, and characterized by showing a heat generation peak of at least 207° C. upon differential thermal analysis as performed in an argon stream at a heating rate of 10° C./min and a sample amount of 1 mg.

(10) The acetylated pyroxylin according to (9), characterized in that fine fibers having a fiber diameter of 0.015 mm to 0.04 mm and a fiber length of at least 0.4 mm account for 90% by weight of all fibers.

According to another aspect, the present invention is embodied as follows.

(11) The acetylated pyroxylin production method according to any one of (1) to (3), characterized in that said catalyst is at least one acid from the group consisting of p-toluenesulfonic acid and perchloric acid.

(12) The acetylated pyroxylin production method according to any one of (1) to (4), characterized in that a washing agent used for washing said crude acetylated pyroxylin is water and/or an organic solvent in which said acetylated pyroxylin is insoluble and which has a boiling point of 40° C. to 200° C. at normal pressure.

(13) The acetylated pyroxylin production method according to any one of (1) to (4), characterized in that a washing agent used for washing said crude acetylated pyroxylin is water and/or an organic solvent in which said acetylated pyroxylin is insoluble and which has a boiling point of 40° C. to 200° C. at normal pressure.

(14) The acetylated pyroxylin production method according to (5), characterized in that a compound or compounds of an alkali metal and/or an alkaline earth metal are added to said water used as said washing agent.

(15) The acetylated pyroxylin production method according to (5), characterized in that a compound or compounds of an alkali metal and/or an alkaline earth metal are added to said water used as said washing agent.

(16) An acetylated pyroxylin obtained by the production method according to any one of (1) to (8) and (11) to (15).

(17) The acetylated pyroxylin according to (16), characterized by being an acetylated pyroxylin as recited in (9) or (10).

(18) The production method according to any one of (1) to (8) and (11) to (15), characterized in that an acetylated pyroxylin as recited in (9) or (10) is obtained.

According to yet another aspect, the present invention is embodied as follows.

(19) The production method according to (1), characterized in that anhydrous acetic acid is used as said acetylating agent.

(20) The production method according to any one of (1) to (8), (11) to (15) and (19), characterized in that anhydrous acetic acid is used as said acetylating agent, said anhydrous acetic acid being used in an amount of 3 to 15 moles per mole of a hydroxyl group in the pyroxylin to be acetylated.

(22) The production method according to any one of (1) to (8), (11) to (15) and (19) to (21), characterized in that anhydrous acetic acid is used as said acetylating agent, said anhydrous acetic acid being used in an amount of up to 20 parts by weight per 100 parts by weight of said dispersion medium.

(23) The production method according to any one of (1) to (8), (11) to (15) and (19) to (21), characterized in that anhydrous acetic acid is used as said acetylating agent, said anhydrous acetic acid being used in an amount of up to 15 parts by weight per 100 parts by weight of said dispersion medium.

(24) The production method according to any one of (1) to (8), (11) to (15) and (19) to (20), characterized in that anhydrous acetic acid is used as said acetylating agent, said anhydrous acetic acid being used in an amount of 2 to 20 moles per mole of a hydroxyl group in the pyroxylin to be acetylated and up to 20 parts by weight per 100 parts by weight of said dispersion medium.

(25) The production method according to any one of (1) to (8), (11) to (15), (19) and (21), characterized in that anhydrous acetic acid is used as said acetylating agent, said anhydrous acetic acid being used in an amount of 3 to 15 moles per mole of a hydroxyl group in the pyroxylin to be acetylated and up to 20 parts by weight per 100 parts by weight of said dispersion medium.

(26) The production method according to any one of (1) to (8), (11) to (15) and (19) to (20), characterized in that anhydrous acetic acid is used as said acetylating agent, said anhydrous acetic acid being used in an amount of 2 to 20 moles per mole of a hydroxyl group in the pyroxylin to be acetylated and up to 15 parts by weight per 100 parts by weight of said dispersion medium.

(27) The production method according to any one of (1) to (8), (11) to (15), (19) and (21), characterized in that anhydrous acetic acid is used as said acetylating agent, said anhydrous acetic acid being used in an amount of 3 to 15 moles per mole of a hydroxyl group in the pyroxylin to be acetylated and up to 15 parts by weight per 100 parts by weight of said dispersion medium.

(28) An acetylated pyroxylin obtained by the production method according to any one of (19) to (27). (29) The acetylated pyroxylin according to (28), characterized by being an acetylated pyroxylin as recited in (9) or (10).

(30) The production method according to any one of (19) to (27), characterized in that an acetylated pyroxylin as recited in (9) or (10) is obtained.

According to the present invention, there is provided a method for producing acetylated pyroxylin by the reaction of pyroxylin with anhydrous acetic acid, which enables a portion of the anhydrous acetic acid taking no part in the reaction to be recovered after the reaction. With this method, production installations can be simplified, and stable quality can be achieved as well. The present invention also provides acetylated pyroxylin having improved heat resistance and stability.

According to the present invention, pyroxylin is first subjected to an acetylation reaction while the pyroxylin is dispersed in a dispersion medium such as toluene and kept in a solid phase (fine fiber form) state. Then, acetylated pyroxylin is separated from a reaction solution by means of filtration, so that an extra portion of the anhydrous acetic acid taking no part in the acetylation reaction can be immediately recovered. This can dispense with the precipitation process needed for a prior art solution reaction method, and so can eliminate an unstable quality factor due to product particle size variations. In addition, the process of washing the post-reaction crude acetylated pyroxylin is designed in such a manner that the crude acetylated pyroxylin is washed at a high temperature of 60 to 105° C. and with a stabilizer-containing washing agent. It is thus possible to provide acetylated pyroxylin having improved heat resistance and stability.

MODE OF CARRYING OUT THE INVENTION

Anhydrous acetic acid is usually used as the acetylating agent. Referring the first limitation to the amount of anhydrous acetic acid used, it is required that anhydrous acetic acid be used in an amount of 2 to 20 moles, and preferably 3 to 15 moles per mole of a hydroxyl group in the pyroxylin to be acetylated. At less than 2 moles, the acetylation reaction does hardly proceed. On the other hand, the addition of anhydrous acetic acid in an amount of greater than 20 moles is insignificant. Referring to the second limitation to the amount of anhydrous acetic acid used, it is required that anhydrous acetic acid be used in an amount of up to 20 parts by weight, and preferably up to 15 parts by weight per 100 parts by weight of the dispersion medium.

At greater than 20 parts by weight, pyroxylin may possibly be dissolved in the reaction solution, i.e., a medium composed mainly of a solution mixture of the dispersion medium and anhydrous acetic acid, because the anhydrous acetic acid is a good solvent for pyroxylin. This may make it impossible to conduct the reaction of pyroxylin with anhydrous acetic acid while the pyroxylin is kept in a solid phase state. In the present invention, the first and second limitations to the amount of anhydrous acetic acid should be satisfied at the same time.

For the dispersion medium, it is required to use a medium in which both pyroxylin and acetylated pyroxylin are insoluble. For such a medium, it is preferable to use an organic solvent having a boiling point of 40° C. to 200° C., and especially 50° C. to 150° C. at normal pressure. Examples of such an organic solvent are aromatic hydrocarbons having 6 to 10 carbon atoms, as represented by benzene, toluene, and xylene. For the dispersion medium, these organic solvents may be used alone or in admixture of two or more. Preferably, the amount of the dispersion medium should be 10 to 80 times, and especially 15 to 40 times as large as the weight of pyroxylin. At less than 10 times non-uniform reaction may occur due to insufficient agitation of slurry, and at greater than 80 times production efficiency becomes worse although the present invention may be somehow carried out.

For the catalyst, general acetylating catalysts such as sulfuric acid, pyridine and various amines may be used. However, it is preferable to use at least one selected from the group consisting of p-toluenesulfonic acid and perchloric acid. Of these catalysts, perchloric acid is most preferred because it is effective in a small amount and can yield acetylated pyroxylin having high stability. These catalyst may be used in admixture. The acetylating catalyst should preferably be used in a net amount of 0.1 to 5.0 parts by weight, especially 0.3 to 2.0 parts by weight for perchloric acid and 5 to 60 parts by weight, especially 10 to 50 parts by weight for p-toluenesulfonic acid, as calculated per 100 parts by weight of the starting pyroxylin. Too little a catalyst makes the acetylation reaction less likely to occur, and too much presents some problems such as possible denitration of pyroxylin and a waste of catalyst.

The starting pyroxylin material used in the present invention should comprise fine fibers having a fiber diameter of 0.01 mm to 0.05 mm, and preferably 0.15 mm to 0.04 mm, and should be in such a form that they can be dispersed in the dispersion medium. This is because the pyroxylin is subjected to the acetylation reaction while it is kept in a solid state. Usually, pyroxylin is available in the form of an aggregate comprising fine fibers having the aforesaid fiber diameter and a fiber length of 0.5 mm to 2.0 mm. In the present invention, however, the fiber aggregate should be disintegrated into individual fibers so that they can be well stirred in the dispersion medium. If the fibers in such a state drift in the dispersion medium, the solution can then have a uniform composition everywhere so that the acetylation reaction can occur satisfactorily. With the solution composition according to the present invention, the fibers are swollen to a certain extent with the result that the substance needed for the reaction penetrates into the fibers, so that the acetylation reaction can occur not only on the surfaces of the fibers but also in the interiors of the fibers. In addition, it is easy to remove impurities from within the fibers by means of extraction and washing in the post-reaction washing process, because the fibers have a small diameter as already mentioned. It is thus possible to obtain acetylated pyroxylin having improved heat resistance and stability.

The degree of acetylation of the acetylated pyroxylin according to the present invention may be varied by a choice of the degree of nitration of the starting pyroxylin. In this regard, however, it is noted that the degree of nitration of acetylated pyroxylin may become lower than that of the starting pyroxylin due to denitration of the starting pyroxylin during the production process. Accordingly, the starting pyroxylin should be selected while such a case is taken into account. In the present invention, all pyroxylin materials with known degrees of nitration are available. However, it is preferable to use as the starting material a pyroxylin having a degree of nitration of 0.5 to 2.6, and preferably 1.0 to 2.5. At less than 0.5 any significant feature can hardly be imparted to the resultant acetylated pyroxylin because the performance difference between the acetylated pyroxylin and the starting pyroxylin is small. At greater than 2.6, too, there is little or no characteristic difference between the resultant acetylated pyroxylin and the starting pyroxylin. The degree of nitration of pyroxylin may be determined as by conducting elemental analysis to find the amount of nitrogen.

Basically, the degree of acetylation of the acetylated pyroxylin according to the present invention becomes lower than the amount of the residual hydroxyl group in the starting pyroxylin. In some cases, however, this degree of acetylation becomes higher than the amount of the residual hydroxyl group although depending on the aforesaid degree of denitration. The degree of acetylation may be controlled by the reaction temperature and time as well as the amount of the catalyst and anhydrous acetic acid used. The degree of acetylation should be in the range of 0.3 to 2.0. At less than 0.3, the heat resistance of the acetylated pyroxylin is as low as that of the starting pyroxylin; the effect by acetylation is slender. At greater than 2.0, there is little or no characteristic difference between the acetylated pyroxylin and the starting pyroxylin.

The reaction temperature should preferably be in the range of 25° C. to 50° C., and especially 30° C. to 45° C., and the reaction time should preferably be selected from the range of 0.5 hours to 5 hours, and especially 1 hour to 4 hours. Within these temperature and time ranges, the degree of acetylation may be controlled. When there is a deviation from these temperature and time ranges, i.e., when the reaction temperature is too low or the reaction time is too short, however, any acetylation reaction does not substantially occur. When the reaction temperature is too high or the reaction time is too long, on the other hand, denitration is likely to occur or other problem may arise.

After the acetylation reaction of the starting pyroxylin, it is required in the present invention that crude acetylated pyroxylin be separated from the reaction solution by means of filtration. It is then possible to recover anhydrous acetic acid, the organic solvent used as the dispersion medium, and reaction by-products such as acetic acid from the filtrate by means of generally used distillation processes, etc. In the present disclosure, the term "crude acetylated pyroxylin" is used to stress that the acetylated pyroxylin is in a green or unpurified state.

The crude acetylated pyroxylin obtained after filtration is of low stability, partly because the reaction solution does not only deposit on the surface of the pyroxylin but also penetrates into the pyroxylin, and partly because the catalyst bonds to the interior of the pyroxylin. It is thus required that the crude acetylated pyroxylin be repeatedly washed and filtered with water and/or the washing agent. For washing, water is primarily used because of its inexpensiveness. However, it is acceptable to use other washing solvent optionally with water. For the washing agent in this case, use may be made of an organic solvent in which acetylated pyroxylin is insoluble. For instance, an aromatic hydrocarbon having 6 to 10 carbon atoms or a mixture of two or more such hydrocarbons used as the dispersion medium may be used. Particularly preferred examples of the washing agent are alcohols having 1 to 4 carbon atoms, for instance, methanol, ethanol, n-propanol, isopropanol, n-butanol, and isobutanol.

Preferably, the washing process should include a thermal treatment step of holding the crude acetylated pyroxylin in water and/or the washing agent at a temperature of 60° C. to 105° C., because the stability of the acetylated pyroxylin becomes much better. Preferably in this case, the thermal treatment temperature should be in the range of 60° C. to 105° C. and the thermal treatment time should be in the range of 1 hour to 6 hours. At lower than 60° C. the effect on stability improvements becomes insufficient, and at higher than 105° C. there is a possibility that the acetylated pyroxylin may be slowly disintegrated. The thermal treatment may be repeatedly conducted with varying holding media. Usually, it is preferable that the thermal treatment be carried out in boiling water. In addition to, before or after that thermal treatment, however, it is acceptable to carry out another thermal treatment at a suitable temperature between 60° C and 105° C. in an alcohol having 1 to 4 carbon atoms, for instance, methanol, ethanol, n-propanol, isopropanol, n-butanol, and isobutanol, of which isopropanol is most preferred.

As a stabilizer for the acetylated pyroxylin, it is preferable to add a compound or compounds of an alkali metal and/or an alkaline earth metal into the water acting as the washing agent. For the compounds of the alkali metal and alkaline earth metal, it is acceptable to use hydroxides of metals such as sodium, potassium, calcium, magnesium and strontium, or salts of these metals with weak acids represented by carbonic acid, acetic acid, etc. Exemplary compounds are sodium carbonate, sodium acetate, calcium hydroxide, and calcium acetate. In use, one or two or more of these compounds are first dissolved in water at a concentration of about 10 ppm to 5,000 ppm, and preferably about 50 ppm to 1,000 ppm. The washing process and/or the thermal treatment process should preferably be carried out, using the thus obtained solution. At a concentration of less than 10 ppm, stability may possibly become insufficient. At greater than 5,000 ppm, the effect for justifying this amount cannot be obtained although there is no grave problem.

In the present invention, the stabilizer-containing water is not necessarily used throughout the washing process and/or the thermal treatment process. In other words, it is usually acceptable to use the water somewhere in the washing process and/or the thermal treatment process. In this connection, it is noted that the stabilizer may be added into the washing solvent, especially an alcohol having 1 to 4 carbon atoms.

The acetylated pyroxylin produced according to the present invention explained above is excellent in terms of heat resistance and stability, and so can be used as raw materials for explosives, paints, etc.

In the present invention, the heat resistance was estimated by differential thermal analysis, and the stability was estimated in terms of heat life according to JIS-K4810, although details thereof will be described in the following examples.

EXAMPLE

By way of detailed illustration but not by way of limitation, the present invention are now explained with reference to some examples.

Example 1

Net one hundred (100) parts by weight of pyroxylin made by Daicel Chemical Industries Ltd., and having a nitric acid ester substitution degree of 2.5 were well dispersed under agitation with 2,600 parts by weight of toluene. Under continued agitation, 290 parts by weight of anhydrous acetic acid were added to the dispersion. The dispersion was heated to 40° C., and then stirred with the addition thereto of 30 parts by weight of a catalyst p-toluenesulfonic acid for a further 3 hours to finish the acetylation reaction. Then, the reaction solution was cooled down to room temperature. During this reaction process, the pyroxylin and the reaction product, i.e., crude actylated pyroxylin were dispersed in the reaction solution while they were kept in a solid phase (fine fiber) state. This solid-liquid mixture was separated by filtration into a filtrate and crude acetylated pyroxylin that was a fiber form of powder solid.

By gas chromatography of this filtrate, it was identified that anhydrous acetic acid, acetic acid and toluene are present therein, and these can be recovered by distillation or the like.

On the other hand, the crude acetylated pyroxylin was stirred at normal pressure and a reflux temperature for 1 hour with the addition thereto of 2,400 parts by weight of isopropanol and 4 parts by weight of sodium carbonate. The solution was cooled back to room temperature for removal of solid matter. The solid matter was washed with 10,000 parts by weight of water, then dispersed in 4,000 parts by weight of water, and then stirred at 100° C. for 1 hour with the addition thereto of 0.3 parts by weight of calcium acetate. After cooling, the solid matter was removed, then washed with 20,000 parts by weight of water, and then washed and filtered twice with 2,400 parts by weight of ethanol to obtain purified acetylated pyroxylin.

Observation of the acetylated pyroxylin and the starting pyroxylin under an optical microscope indicated that the starting pyroxylin comprises fibers of 0.02 mm to 0.03 mm in diameter and 0.5 mm to 2.0 mm in length as a primary component, and the acetylated pyroxylin, too, has quite the same fiber form, showing that the fiber form remains intact even through the aforesaid production process.

Studies of infrared absorption spectra for the acetylated pyroxylin showed that there is strong absorption around both 1280 $cm^{-1}$ and 1650 $cm^{-1}$ based on nitric acid ester, and absorption spectra for acetic acid ester resulting from acetylation are found around both 1220 $cm^{-1}$ and 1750 $cm^{-1}$, each with medium strength. On the other hand, weak and broad absorption based on hydroxyl groups, which was found around 3500 $cm^{-1}$ in the starting pyroxylin, became very feeble. In the obtained acetylated pyroxylin, it was thus found that nearly all hydroxyl groups in the starting pyroxylin are acetylated.

Differential thermal analysis (DTA) was conducted to determine the heat resistance of the acetylated pyroxylin. weighed 1 mg of an acetylated pyroxylin sample was placed on an aluminum dish for differential thermal analysis, and some droplets of acetone were added to the sample for dissolution. The solution was then dried to form an acetylated pyroxylin film on the bottom of the aluminum dish. For this sample, differential thermal analysis was conducted at a heating rate of 10° C. /min. in an argon stream, using a differential thermal analyzer DT40 made by Shimadzu Corporation. As a result, an thermal decomposition exothermic curve having a peak at 208° C. was obtained.

To determine the stability of this acetylated pyroxylin, heat-life was measured according to the 65° C. heat resistance test method (JIS-K4810), using potassium iodide starch paper as test paper. As a result, the heat-life was found to be 40 minutes or longer. However, the test was aborted after the lapse of 40 minutes because the test paper did not change color.

The results of the above tests are set out in Table 1.

Comparative Example 1

Similar differential thermal analysis and heat resistance testing were carried out for the starting pyroxylin used in Example 1. As shown in Table 2, the exothermic peak temperature was 199° C., and the heat life was 38 minutes as determined according to the 65° C. heat resistance test method. These results are shown in Table 2 together with the results of infrared absorption spectra.

Comparative Example 2

One hundred (100) parts by weight of the same pyroxylin as in Example 1 were dissolved in 700 parts by weight of anhydrous acetic acid. Then, the solution was stirred with the addition of 1,800 parts by weight of toluene thereto. The pyroxylin remained dissolved in a transparent viscous solution. After the solution was heated to 40° C., the acetylation reaction was carried out by stirring the solution for 30 minutes with the addition thereto of 3.6 parts by weight of a catalyst sulfuric acid, after which the solution was cooled down to room temperature. The transparent viscous solution was poured in 3,200 parts by weight of ethanol, and stirred therewith at a high speed of 7,000 rpm in a homogenizer to precipitate crude acetylated pyroxylin therein. This solid-liquid mixture was separated by filtration into a filtrate and crude acetylated pyroxylin that was a solid matter.

By gas chromatography of this filtrate, it was identified that ethanol, ethyl acetate, acetic acid, anhydrous acetic acid and toluene are present therein. In other words, it was found that a part of the anhydrous acetic acid used changes to ethyl acetate and acetic acid; the anhydrous acetic acid cannot be recovered as such.

On the other hand, the solid matter was washed and filtered with the addition of 2,400 parts by weight of ethanol thereto. Then, the solid matter was washed with 20,000 parts by weight of water, then dispersed in 4,000 parts by weight of water, and then stirred at 100° C. for 1 hour with the addition of 2 parts by weight of calcium acetate thereto. After cooling, the solid matter was removed, then washed with 20,000 parts by weight of water, and then washed and filtered twice with 2,400 parts by weight of ethanol to obtain purified acetylated pyroxylin.

Apparently, this acetylated pyroxylin looked like a spongy or fibrous bulky powder. However, taffy-like lumps of a few mm in diameter were scattered in the powder. Observation of this powdery portion under an optical microscope indicated that unshapely lumps of about 0.5 mm to 1.5 mm in size are complicatedly entangled with one another; that is, the powder is remarkably different in form from the starting pyroxylin.

Infrared absorption spectra for the aforesaid powder and the aforesaid lump of a few mm in diameter were obtained. As a result, spectra substantially similar to those in Example 1 were obtained.

However, differential thermal analysis conducted for the power and the lump of a few mm in diameter as in Example 1 indicated that the powder portion has an exothermic peak temperature of 207° C., but the lump portion has an exothermic peak temperature of 204° C., showing that the decomposition temperature of the lump portion is low.

Heat-life was measured according to the 65° C. heat resistance test method (JIS-K4810) as in Example 1. The powder portion had a heat-life of 40 minutes or longer, but the lump portion had a heat-life of 14 minutes, showing that the stability of the lump portion is low.

With the method described in the instant example, it is thus found that not only is it difficult to recover anhydrous acetic acid but also there is a quality variation. These results are shown in Table 2.

Example 2

Example 1 was repeated with the exception that 2,400 parts by weight of isopropanol were changed to 2,400 parts by weight of ethanol. Observation of the obtained acetylated pyroxylin gave the same results as in Example 1. Other results are shown in Table 1.

Example 3

Example 1 was repeated with the exception that 30 parts by weight of p-toluenesulfonic acid were changed to 0.5 parts by weight of perchloric acid. Observation of the obtained acetylated pyroxylin gave the same results as in Example 1. Other results are shown in Table 1.

Example 4

The acetylation reaction was carried out following Example 1 with the exception that toluene was changed to xylene, 30 parts by weight of p-toluenesulfonic acid were changed to 1.0 part by weight of perchloric acid, and the reaction time was changed from 3 hours to 2 hours. A similar reaction product was separated by filtration. The obtained crude acetylated pyroxylin was washed and filtered with 2,400 parts by weight of ethanol at room temperature to remove a solid matter therefrom. The solid matter was washed with 10,000 parts by weight of water, then dispersed in 4,000 parts by weight of water, and then stirred at 100° C. for 1 hour with the addition of 0.5 parts by weight of calcium acetate thereto. After cooling, the solid matter was removed from the dispersion, then washed with 20,000 parts by weight of water, and then washed and filtered with 2,400 parts by weight of ethanol to obtain purified acetylated pyroxylin. Observation of the obtained acetylated pyroxylin under an optical microscope gave the same results as in Example 1. Other results are shown in Table 1.

TABLE 1

|  | Example 1 | Example 2 | Example 3 | Example 4 |
|---|---|---|---|---|
| Infrared absorption spectra (*) | | | | |
| For nitric acid ester | strong | strong | strong | strong |
| For acetic acid ester | medium | medium | medium | medium |
| For hydroxyl group | feeble | feeble | feeble | feeble |

TABLE 1-continued

|  | Example 1 | Example 2 | Example 3 | Example 4 |
|---|---|---|---|---|
| Heat resistance (DTA) | | | | |
| Exothermic peak Temp. (° C.) | 208 | 207 | 212 | 208 |
| Stability (65° C. heat resistance test) | | | | |
| Heat-life (**) (min.) | >40 | 31 | >40 | 36 |

(*) Absorption for nitric acid ester:
Identification of absorption peak strength around 1280 cm$^{-1}$ and 1650 cm$^{-1}$
Absorption for acetic acid ester:
Identification of absorption peak strength around 1220 cm$^{-1}$ and 1750 cm$^{-1}$
Absorption for hydroxyl group:
Identification of absorption peak strength around 3500 cm$^{-1}$
(**) The test was aborted when the test paper did not change color even after the lapse of 40 minutes. This is shown by >40.

TABLE 2

|  | Comp. Ex. 1 (pyroxlin) | Comp. Ex. 2 (powder) | Comp. Ex. 2 (lump) |
|---|---|---|---|
| Infrared absorption spectra (*) | | | |
| For nitric acid ester | strong | strong | strong |
| For acetic acid ester | not found | medium | medium |
| For hydroxyl group | weak (broad) | feeble | feeble |
| Heat resistance (DTA) | | | |
| Exothermic peak Temp. (° C.) | 199 | 207 | 204 |
| Stability (65° C. heat resistance test) | | | |
| Heat-life (**) (min.) | 38 | >40 | 14 |

For (*) and (**), see Table 1.

APPLICABILITY TO THE INDUSTRY

According to the present invention, there can be provided a method for producing acetylated pyroxylin, which makes it possible to recover an extra portion of anhydrous acetic acid taking no part in the reaction with pyroxylin.

There can also be provided a method for producing acetylated pyroxylin having improved heat resistance and stability, which can dispense with any precipitation process and, hence, any high-speed agitator, thereby eliminating an unstable quality factor due to product particle size variations.

Further, there can be provided a fine fiber form of acetylated pyroxylin having improved heat resistance and stability.

What we claim is:

1. A method for producing acetylated pyroxylin by action of an acetylating agent and a catalyst on pyroxylin, comprising dispersing said pyroxylin in a dispersion medium, subjecting said pyroxylin to an acetylation reaction in the presence of the catalyst while said pyroxylin is kept in a solid phase state, thereby obtaining crude acetylated pyroxylin, separating said crude acetylated pyroxylin from a reaction solution by means of filtration, and washing said crude acetylated pyroxylin upon separation, wherein the washing agent is an organic solvent which does not contain water in which said acetylated pyroxylin is insoluble and which has a boiling point between 40° C. and 200° C. at normal pressure and a compound or compounds of an alkali metal and/or alkaline earth metal are added into said organic solvent used as said washing agent.

2. The acetylated pyroxylin production method according to claim 1, wherein said acetylating agent is anhydrous acetic acid, and said dispersion medium is an organic solvent which has a boiling point between 40° C. and 200° C. at normal pressure, in which said pyroxylin and said acetylated pyroxylin are insoluble and which is unreactive with said anhydrous acetic acid.

3. The acetylated pyroxylin production method according to claim 2, wherein said dispersion medium comprises an aromatic hydrocarbon selected from the group consisting of aromatic hydrocarbons having 6 to 10 carbon atoms or a mixture of two or more such aromatic hydrocarbons.

4. The acetylated pyroxylin production method according to any of claims 1 to 3, wherein said catalyst is selected from the group consisting of p-toluenesulfonic acid and perchloric acid.

5. The acetylated pyroxylin production method according to claim 1, wherein said organic solvent used as said washing agent is an alcohol having 1 to 4 carbon atoms.

6. The acetylated pyroxylin production method according to claim 1, wherein the process of washing said crude acetylated pyroxylin includes a step of holding said crude acetylated pyroxylin in said washing agent at a temperature between 60° C. and 105° C.

7. The acetylated pyroxylin production method according to claim 1, wherein said compound or compounds are added into said organic solvent at a concentration of about 10 ppm to 5,000 ppm.

8. The acetylated pyroxylin production method according to claim 1, wherein said compound or compounds are selected from the group consisting of sodium carbonate, sodium acetate, calcium hydroxide, and calcium acetate.

* * * * *